(12) United States Patent
Bauer

(10) Patent No.: US 10,055,201 B2
(45) Date of Patent: Aug. 21, 2018

(54) DEVELOPMENT OF MULTIPLE CLASSES OF USER INTERFACES FOR A SOFTWARE APPLICATION

(71) Applicant: Embarcadero Technologies, Inc., San Francisco, CA (US)

(72) Inventor: Allen Bauer, Scotts Valley, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 122 days.

(21) Appl. No.: 14/081,949

(22) Filed: Nov. 15, 2013

(65) Prior Publication Data
US 2015/0143337 A1      May 21, 2015

(51) Int. Cl.
*G06F 9/46*      (2006.01)
*G06F 8/34*      (2018.01)

(52) U.S. Cl.
CPC ..................... *G06F 8/34* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 6,760,902 B1 * | 7/2004 | Ott | G06F 8/38 715/763 |
| 6,802,058 B2 | 10/2004 | Banavar et al. | |
| 7,752,631 B2 | 7/2010 | Dorn et al. | |
| 7,949,954 B1 * | 5/2011 | Jezek, Jr. | G06F 3/048 705/37 |
| 8,161,179 B2 | 4/2012 | Dote et al. | |
| 8,365,144 B1 * | 1/2013 | Webb | G06F 3/048 709/224 |
| 8,499,276 B2 * | 7/2013 | Kooy | G06F 8/38 717/100 |
| 2002/0069265 A1 * | 6/2002 | Bountour | H04N 7/181 709/219 |
| 2004/0015893 A1 * | 1/2004 | Banavar | G06F 9/4443 717/138 |
| 2004/0225995 A1 * | 11/2004 | Marvin | G06F 8/41 717/100 |

(Continued)

OTHER PUBLICATIONS

Ding et al., A Graphical Single Authoring Framework for Building Multi Platform User Interfaces, 2004 (Year: 2004).*

(Continued)

*Primary Examiner* — S. Sough
*Assistant Examiner* — Zhan Chen

(57) ABSTRACT

Methods and systems for developing multiple classes of user interfaces for a software application are disclosed. A master view of a software application is displayed, at a computer system, for use in developing multiple classes of user interfaces for the software application wherein each of the multiple classes pertain to at least one form factor for a device to execute the software application. Subordinate views are created, at the computer system, wherein each of the subordinate views pertain to one of the multiple classes of user interfaces and comprise deltas that alter the master view such that a first subordinate view is displayed based on the master view combined with a first group of the deltas for the first subordinate view. A change is propagated to the master view to each of the subordinate views, at the computer system.

20 Claims, 3 Drawing Sheets

(56) References Cited

U.S. PATENT DOCUMENTS

| | | | | |
|---|---|---|---|---|
| 2007/0074161 | A1* | 3/2007 | Dorn | G06F 9/4443 |
| | | | | 717/113 |
| 2007/0288890 | A1* | 12/2007 | Wells | G06F 8/38 |
| | | | | 717/113 |
| 2008/0256468 | A1* | 10/2008 | Peters | H04L 67/02 |
| | | | | 715/764 |
| 2009/0002361 | A1* | 1/2009 | Dote | G06F 9/4443 |
| | | | | 345/418 |
| 2013/0064336 | A1* | 3/2013 | Schadt | G06F 17/30176 |
| | | | | 375/354 |
| 2014/0108970 | A1* | 4/2014 | Syu | G06F 3/048 |
| | | | | 715/760 |
| 2014/0337706 | A1* | 11/2014 | Hsu | G06F 17/30274 |
| | | | | 715/234 |

OTHER PUBLICATIONS

Richter, A Transformational Approach to Multi Device Interfaces, 2005 (Year: 2005).*

Branton et al., Toward Rapid and Iterative Development of Tangible Collaborative Deistrubted User Interfaces, 2013 (Year: 2013).*

* cited by examiner

```
                                                                    Process
                                                                    200
┌─────────────────────────────────────────────────────────────────┐
│ A MASTER VIEW OF A SOFTWARE APPLICATION IS DISPLAYED, AT A      │
│ COMPUTER SYSTEM, FOR USE IN DEVELOPING MULTIPLE CLASSES OF USER │
│ INTERFACES FOR THE SOFTWARE APPLICATION WHEREIN EACH OF THE     │
│ MULTIPLE CLASSES PERTAIN TO AT LEAST ONE FORM FACTOR FOR A      │
│ DEVICE TO EXECUTE THE SOFTWARE APPLICATION.                     │
│                              202                                │
└─────────────────────────────────────────────────────────────────┘
                                 ↓
┌─────────────────────────────────────────────────────────────────┐
│ SUBORDINATE VIEWS ARE CREATED, AT THE COMPUTER SYSTEM, WHEREIN  │
│ EACH OF THE SUBORDINATE VIEWS PERTAIN TO ONE OF THE MULTIPLE    │
│ CLASSES OF USER INTERFACES AND COMPRISE DELTAS THAT ALTER THE   │
│ MASTER VIEW SUCH THAT A FIRST SUBORDINATE VIEW IS DISPLAYED     │
│ BASED ON THE MASTER VIEW COMBINED WITH A FIRST GROUP OF THE     │
│ DELTAS FOR THE FIRST SUBORDINATE VIEW.                          │
│                              204                                │
└─────────────────────────────────────────────────────────────────┘
                                 ↓
┌─────────────────────────────────────────────────────────────────┐
│ A CHANGE IS PROPAGATED TO THE MASTER VIEW TO EACH OF THE        │
│ SUBORDINATE VIEWS, AT THE COMPUTER SYSTEM.                      │
│                              206                                │
└─────────────────────────────────────────────────────────────────┘
                                 ↓
┌─────────────────────────────────────────────────────────────────┐
│ A CHANGE TO THE FIRST SUBORDINATE VIEW IS STORED, AT THE        │
│ COMPUTER SYSTEM, AS A DELTA IN THE FIRST GROUP OF THE DELTAS.   │
│                              208                                │
└─────────────────────────────────────────────────────────────────┘
                                 ↓
┌─────────────────────────────────────────────────────────────────┐
│ THE SOFTWARE APPLICATION IS CREATED, AT THE COMPUTER SYSTEM,    │
│ SUCH THAT UPON EXECUTING THE SOFTWARE APPLICATION AT A FIRST    │
│ DEVICE, THE SOFTWARE APPLICATION WILL DETERMINE AN APPROPRIATE  │
│ USER INTERFACE FOR THE FIRST DEVICE BASED ON A FORM FACTOR OF   │
│ THE FIRST DEVICE WHEREIN THE APPROPRIATE USER INTERFACE IS ONE  │
│ OF THE MULTIPLE CLASSES OF USER INTERFACES.                     │
│                              210                                │
└─────────────────────────────────────────────────────────────────┘
                                 ↓
┌─────────────────────────────────────────────────────────────────┐
│ THE SOFTWARE APPLICATION IS SENT TO A FIRST DEVICE WHEREIN THE  │
│ SOFTWARE APPLICATION COMPRISES THE MULTIPLE CLASSES OF USER     │
│ INTERFACES BASED ON THE MASTER VIEW AND A PLURALITY OF GROUPS   │
│ OF THE DELTAS.                                                  │
│                              212                                │
└─────────────────────────────────────────────────────────────────┘
```

Fig. 2

DEVELOPMENT OF MULTIPLE CLASSES OF USER INTERFACES FOR A SOFTWARE APPLICATION

FIELD OF THE TECHNOLOGY

The present technology relates generally to developing multiple classes of user interfaces for a software application.

BACKGROUND

Many electronic devices use software. Electronic devices come in a variety of form factors and using a variety of operating systems or firmware to operate which may be referred to as platforms. A developer may develop of software for use by the electronic devices and may develop the software for multiple different platforms. However, each platform may comprise a different form factor and thus have different requirements for a software application executing on the platform. Thus a developer may be forced to develop or program more than one version of the same software.

BRIEF DESCRIPTION OF DRAWINGS

FIG. 2 is flowchart for developing multiple classes of user interfaces for a software application in accordance with embodiments of the present technology.

Figure 1:
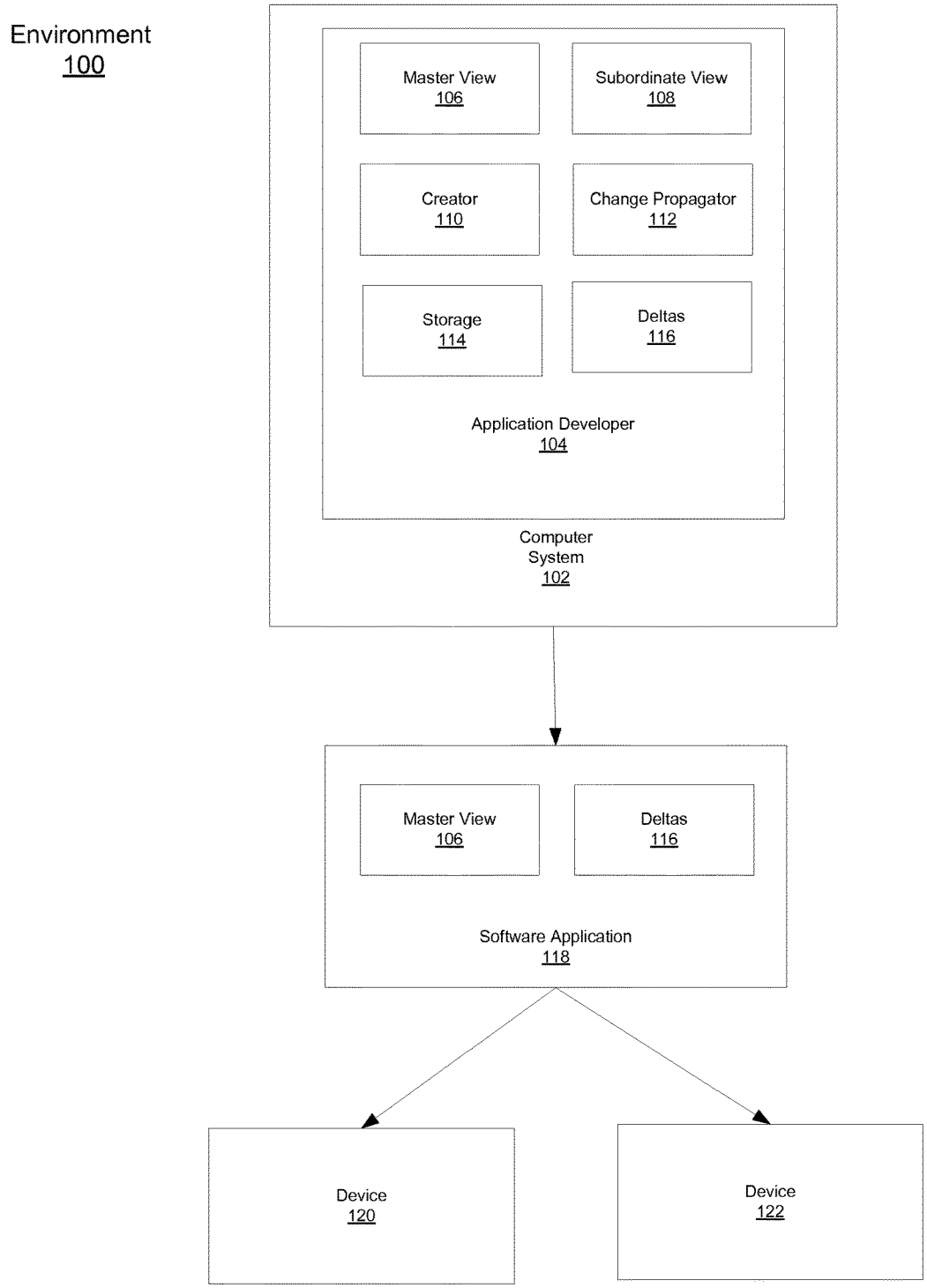
FIG. 1 is a block diagram of an environment for developing multiple classes of user interfaces for a software application in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "creating," "displaying," "executing," "propagating," "receiving," "determining," "storing," "sending," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Developing Multiple Classes of User Interfaces for a Software Application Modern electronic devices comprise a variety of platforms which employ a variety of different hardware devices and components including different form factors such as display size, screen resolution, etc. Moreover, the variety of platforms employs a variety of operating systems and firmware for use in executing application software. This is especially true for mobile handheld devices such as smart phones. Such mobile handheld devices may download and employ application software, software applications, or apps that have a user interface that must be designed to execute on the platform associated with the individual mobile handheld device. A developer of a software application may wish to develop the software application to execute on as many different platforms as possible. However, the developer may be forced to program or develop separate and distinct user interfaces for each target device or platform. Alternatively, the developer may be required to incorporate programming logic to adjust the user interface to "fit" a particular device's form-factor. The present technology provides a developer with systems and methods that assist the developer in developing multiple classes or versions of user interfaces for the same software application. The present technology saves the developer time and effort by automating some processes.

This present technology combines the technique of creating separate and distinct user interfaces with the technique of adjusting the user interface fit for each form factor. This allows the developer to better visualize the final design for each of the targeted devices and will minimize or eliminate the amount of programming logic required to adjust the user interface for a given device.

In one embodiment, the present technology provides a developer with a software application developer that allows a developer to develop a software application while simultaneously creating multiple versions or multiple different user interfaces of the same software application for use with different device platforms. The different versions or user interfaces of the same software application may be referred to as multiple classes. The present technology operates by defining a targeted device as being part of a class. A class may refer to an individual device or to a plurality of devices that have the same or similar form factor.

The software application developer provides the developer with a master view that shows the developer every attribute or feature of the software application. The master view may be employed by the developer to add, remove, or change attributes and features of the software application under development. In one embodiment, the software application developer has an interface that provides the developer with a library of options for the developer to use in the creation of the software application. The software application developer may visually display to the developer what the software application will look like when it is executing at a target device.

The software application developer also provides the developer with subordinate views where each subordinate view pertains to a different class of devices. Each subordinate view displays features and attributes of the master view. However, features and attributes of the master view may be altered or hidden in a given subordinate view. In one embodiment, features and attributes of the master view may not be removed or deleted in a subordinate view, but may only be hidden. In one embodiment, changes made to the master view will be propagated to every subordinate view.

The software application developer may store the changes or alterations to each subordinate view as deltas. Thus a subordinate view may be re-created using the master view and deltas. Once an application is fully developed or created, it may be sent to the target device or devices. The fully developed software application may be sent as the master view with groups of deltas for each of the multiple classes of platforms. The deltas are typically smaller in size than a master view or subordinate view and therefore the storage size for a master view and corresponding deltas are smaller than storage for two different versions of the same software application. Thus when a device receives a fully developed software application created by the present technology, the device receives a software application that is capable of executing several different versions of a user interface.

In one embodiment, when the software application is launched, run, or executed on the target device, the program logic built into the "runtime" of the software application will automatically detect on what device it is operating and select the appropriate or best available view for that device. In one embodiment, there are also systems in place such that the user can override the automatic selection process in cases where that system cannot make an accurate determination.

The present technology may be used to create a software application with multiple different user interfaces or may create different versions of the software application with that may or may not use the same user interface. For example, the software application may be created with the master view pertaining to a full version of the software application and a subordinate view pertaining to a free or lite version of the software application. With the present technology, both the full and free version may be sent to a target device requesting only the free version. The software application then requires the target device to execute the master view with the deltas such that the free version is run. Subsequently, if the target device purchases the full version, the software application will then allow the target device to run the master view without the deltas. Thus the target device may purchase the full version of the software application without being required to download a new or different version of the software application. The present technology may also be used to create different versions with limited functionality or with alternate languages.

Developing Multiple Classes of User Interfaces for a Software Application

Referring to the figures, exemplary embodiments of the technology will now be described. The following description will focus on an embodiment of the present technology, which is implemented using a device with an operating environment or platform such as an operating system. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

FIG. 1 is a block diagram illustrating environment 100 which is an example environment comprising computer system 102, device 120, and device 122. It should be appreciated that computer system 102 may be a standard or customized computer system and may be a desktop, server, laptop, tablet, handheld or other computer system capable of executing developer software. Device 120 and device 122 may also be a desktop, server, laptop, tablet, handheld, smart phone or other computer system capable of executing application software. Computer system 102, device 120 and device 122 each comprise memory, processor(s), data storage and other standard components such as a display.

In one embodiment, computer system 102 executes application developer 104 which is used to develop software application 118 with multiple classes or versions or user interfaces. Application developer 104 comprises an interface to display to a developer and has functionality that assist the developer in creating a software application. For example, the developer may be able to program lines of code in application developer 104 or may be able to use the interface with a cursor to interact with attributes or features for the software application. In one embodiment, application developer 104 comprises master view 106. Master view 106 displays a master or base view of software application 118 to the developer. In one embodiment, the master view displays all of the features and attributes of the software application. The master view may comprise the maximum screen resolution that may be used for software application 118.

A class may refer to an individual device or to a plurality of devices that have the same or similar form factor. For example, one platform may be iOS developed by Apple Inc. and may be used with more than one device such as an iPhone, an iPod, or an iPad. Each of these three devices may be grouped into the same class by the present technology. Alternatively, the Android operating system developed by Google may be used with a large variety of different hardware devices and thus all Android devices may not be placed in the same class. Therefore, a class may be defined to include a group of hardware devices or may define only one device.

In one embodiment, application developer 104 employs creator 110 to create subordinate view 108. Subordinate view 108 is a subordinate or slave view of master view 106. It should be appreciated that application developer 104 may comprise more than one subordinate view created by creator 110. Each of the plurality of subordinate views corresponds or pertains to a different class of the multiple classes of software application 118. Application developer 104 may display only the master view or only the subordinate view or a combination of the master view and subordinate views.

In one embodiment, change propagator 112 operates to detect a change in master view 106 and propagate the change to subordinate view 108 and any other subordinate views. For example, the change may be altering or changing an attribute or feature by adding, deleting or modifying the attribute or feature in master view 106. If a feature such as a radio button with corresponding text is added to the user interface of master view 106, the change propagator 112 propagates the change to subordinate view 108. Propagating a change may also be described as synchronizing the master view and any subordinate views. Conversely, changes or modifications made in a subordinate view such, as subordinate view 108, are not propagated to the master view. In one embodiment, a subordinate view may not be used to add or delete an attribute or feature. An attribute or feature may be modified in the subordinate view. For example, the screen resolution of master view 106 may be modified to be different in subordinate view. Another example is that the location of a button or other feature in master view 106 may be moved to a different region of the user interface for subordinate view 108. There may exist a feature that is in master view 106 and the developer does not desire the feature to be shown in subordinate view 108. In such an instance, the feature may be hidden in subordinate view 108 but may not be deleted.

Switching between a master view and subordinate views may be described as a view system. The view system of the changes to different views may employ a live update mechanism between ancestor and descendant or master and subordinate.

The changes or modifications to subordinate view 108 may be stored in storage 114 as deltas 116. In one embodiment, a delta is program code that defines the difference of a change between master view 106 and subordinate view 108. Each subordinate view of master view 106 may have a group of deltas associated with it. It should be appreciated that a group of deltas may comprise less storage space than an alternate version of software application 118. Thus software application 118 may be sent to a device with master view 106 and deltas 116 such that they combine less data storage requirements than two versions of software application 118 but have the ability to execute multiple classes of software application 118. In one embodiment, application developer 104 allows the developer to program software application 118 using a programming language such as Delphi or C++.

In one embodiment, the present technology is based on visual form inheritance (VFI) such that a subordinate view inherits features and attributes from the master view. In one embodiment, the present technology leverages the same "live-update" and linking mechanism used for VFI. However, VFI relies on the creation of an underlying programmatic "class" corresponding to each form factor; the present technology uses the same underlying programmatic "class" and only manages the deltas between the master and each subordinate view.

A difference between VFI and the present technology is the underlying programmatic "class" remains the same. This has the effect of limiting what the user can do with each "view." In one embodiment, when a developer "drops" a new component onto a subordinate view, it must, instead, be added to the "master-view". This is then propagated back to each subordinate view and the programmatic "source-code" is then updated with the reference to the just added component.

In one embodiment, after software application 118 is created it is sent to a device such as device 120 or device 122. The devices are capable of executing software application 118. In one embodiment, upon execution of software application 118, software application 118 is able to determine the form factor or class of the device it is executing on. Software application 118 then executes a version of software application 118 that is appropriate for the device. The appropriate version may be the best fit for the screen resolution. The executed version of software application 118 may be master view 106 with no deltas or may be a version of software application 118 based on master view with an appropriate group of deltas. In one embodiment, if the master view is employed with no deltas then the delta files are null. In one embodiment, it is not possible for software application 118 to determine an appropriate version of software application 118 for a particular device. If no appropriate version can be determined then the master view with no deltas may be executed as the default or a master view with default deltas may be executed.

In one embodiment, software application 118 is not sent directly to device 120 or device 122 but instead is sent by the developer using computer system 102 to a service distributing software applications. For example, the service may provide a library of applications for download over the Internet to a handheld device or other devices. In one embodiment, the service is an app store.

In one embodiment, device 120 and device 122 are members of different classes of devices but both receive software application 118. Because device 120 and device 122 are different, each may execute a different version of software application 118 even though both devices received an identical copy of software application 118. In one embodiment, the different versions have user interfaces that are different from one another, but software application 118 performs the same functions and utilities on the two devices.

In one embodiment, software application 118 uses master view 106 and groups of deltas to execute different versions of software application 118 where the different versions differ only in the user interface associated with each version.

In one embodiment, software application 118 uses master view 106 and groups of deltas to execute different versions of software application 118 where the different versions differ in the amount of functionality allowed to the particular version. Thus the version executing the master view with no deltas may have full functionality of the software application but the version executing the master view with a given group of deltas has limited functionality of the software application. One example of limited functionality may be a light or lite version of the software application that is distributed without a fee or charge. But when payment is made for the full version of the software application then the software application executes with no deltas and the full version is executed. Thus a device may download a software application and execute the light or free version using the master view with deltas and then subsequently pay the fee and execute the full version without requiring the device to download a new version of the software application.

In one embodiment, software application 118 uses master view 106 and groups of deltas to execute different versions of software application 118 where the different versions differ in the language employed by software application 118. For example, a version of the software application executing with the master view and no deltas may employ the default language such as English where an alternate version of the software application executing with the master view and a group of deltas may employ an alternate language such as German.

Operations

FIG. 2 is a flowchart illustrating process 200 for developing multiple classes of user interfaces for a software application, in accordance with one embodiment of the present invention. In one embodiment, process 200 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 200 is performed by the devices and components in FIG. 1.

At 202, a master view of a software application is displayed, at a computer system, for use in developing multiple classes of user interfaces for the software application wherein each of the multiple classes pertain to at least one form factor for a device to execute the software application. In one embodiment, master view 106, software application 118, computer system 102, and device 120 of FIG. 1 are employed.

At 204, subordinate views are created, at the computer system, wherein each of the subordinate views pertain to one of the multiple classes of user interfaces and comprise deltas that alter the master view such that a first subordinate view is displayed based on the master view combined with a first group of the deltas for the first subordinate view. In one embodiment, subordinate view 108 and deltas 116 of FIG. 1 are employed.

At 206, a change is propagated to the master view to each of the subordinate views, at the computer system. In one embodiment, change propagator 112 of FIG. 1 is employed.

At 208, a change to the first subordinate view is stored, at the computer system, as a delta in the first group of the deltas. This may occur at storage 114 of computer system 102 of FIG. 1.

At 210, the software application is created, at the computer system, such that upon executing the software application at a first device, the software application will determine an appropriate user interface for the first device based on a form factor of the first device wherein the appropriate user interface is one of the multiple classes of user interfaces. In one embodiment, the first device may be device 120 or device 122 of FIG. 1. The appropriate user interface may be a user interface that is the best fit for the device. In one embodiment, the appropriate user interface corresponds to a different version of the software application that may have limited functionality between the different versions or may offer alternate languages between the different versions.

At 212, the software application is sent to a first device wherein the software application comprises the multiple classes of user interfaces based on the master view and a plurality of groups of the deltas. In one embodiment, the software application is not sent directly to the device but is sent to a service such as an app store that distributes software applications to a device. In one embodiment, the first device may be device 120 or device 122 of FIG. 1.

Figure 3:
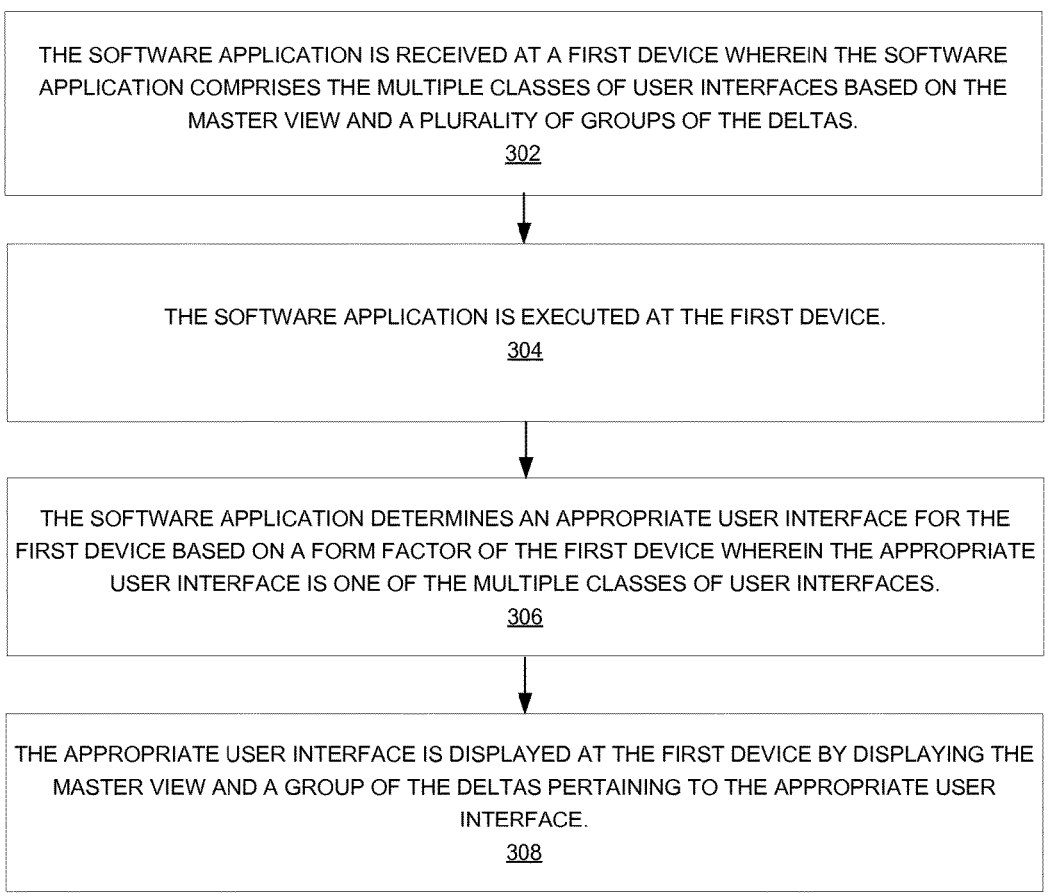
FIG. 3 is flowchart for developing multiple classes of user interfaces for a software application in accordance with embodiments of the present technology.

FIG. 3 is a flowchart illustrating process 300 for developing multiple classes of user interfaces for a software application, in accordance with one embodiment of the present invention. In one embodiment, process 300 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by the devices and components in FIG. 1.

In one embodiment, process 300 is an independent process. In one embodiment, process 300 is a process that is tied to process 200 and occurs after process 200.

At 302, the software application is received at a first device wherein the software application comprises the multiple classes of user interfaces based on the master view and a plurality of groups of the deltas. The application may be received from a service that distributes software applications such as an app store. In one embodiment, the software application is software application 118 of FIG. 1 and the first device is device 120.

At 304, the software application is executed at the first device. The device may comprise a processor, memory and other hardware components for such execution. The execution may be launched in response to a user's command to launch the software application.

At 306, the software application determines an appropriate user interface for the first device based on a form factor of the first device wherein the appropriate user interface is one of the multiple classes of user interfaces. In one embodiment, the appropriate user interface is a best fit for the form factor of the device. In one embodiment, the appropriate user interface corresponds to a different version of the software application that may have limited functionality between the different versions or may offer alternate languages between the different versions.

At 308, the appropriate user interface is displayed at the first device by displaying the master view and a group of the deltas pertaining to the appropriate user interface. In one embodiment, the group of deltas may be delta 116 of FIG. 1. It should be appreciated that that the software application may comprise more than one group of deltas for more than one version of the software application.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 102, device 120, and/or device 122 of FIG. 1. Described below is an example computer system or components that may be used for or in conjunction with aspects of the present technology such as the ability to run or create a three dimensional interface.

It is appreciated that that the present technology can operate on or within a number of different computer systems including general purpose networked computer systems, embedded computer systems, a personal computer such as a desktop computer, a laptop, a notebook, an electronic hand-held device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for developing multiple classes of user interfaces for a software application, sad method comprising:
    displaying a master view for developing a software application for different device platforms, at a computer system, for use in developing multiple classes of user interfaces for said software application, wherein each of said multiple classes pertain to different versions of said software application executing on said different device platforms having at least a same form factor or a same operating system, and wherein said master view visually displays every attribute of said software application available for inclusion in a subordinate view during development;
    displaying subordinate views for developing said software application, at said computer system, wherein each of said subordinate views pertain to one of said multiple classes of user interfaces and comprise a plurality of groups of deltas that alter said master view, wherein each of said subordinate views is for executing said software application on a device pertaining to a class of said multiple classes defined by a corresponding subordinate view, such that a first subordinate view is displayed on devices of a first class based on said master view combined with a first group of said deltas for said first subordinate view;
    propagating a change to said master view to each of said subordinate views, at said computer system;
    receiving an indication to hide an attribute of said software application for said first subordinate view:
    hiding said attribute within said first subordinate view;
    storing a change to said first subordinate view, at said computer system, as a delta in said first group of said deltas, such that said attribute is hidden from display within said first subordinate view for said devices of said first class; and
    creating said software application comprising said master view and a plurality of said groups of said deltas pertaining to said multiple classes, at said computer system, such that upon executing said software application at a first device, said software application will determine an appropriate user interface for said first device based on a form factor of said first device wherein said appropriate user interface is one of said multiple classes of user interfaces.

2. The method as recited in claim 1, further comprising:
    sending said software application to said first device wherein said software application comprises said multiple classes of user interfaces based on said master view and said plurality of groups of said deltas.

3. The method as recited in claim 1, further comprising:
    receiving said software application at said first device wherein said software application comprises said multiple classes of user interfaces based on said master view and said plurality of groups of said deltas; and
    executing said software application at said first device;
    said software application determining an appropriate user interface for said first device based on a form factor of said first device wherein said appropriate user interface is one of said multiple classes of user interfaces;
    determining a class of said multiple classes and a corresponding subordinate view for said class; and
    displaying said appropriate user interface at said first device by displaying said master view and a group of said deltas pertaining to said appropriate user interface defined by said corresponding subordinate view for said class.

4. The method as recited in claim 1 wherein said software application wherein a default user interface for said first device is said master view.

5. The method as recited in claim 1 wherein each of said multiple classes of said user interfaces are each related to a different platform of devices.

6. The method as recited in claim 1 wherein said subordinate views are created based on form inheritance wherein said subordinate views inherit attributes from said master view.

7. The method as recited in claim 1 wherein a different attribute of said software application is hidden for each of said subordinate views.

8. The method as recited in claim 1 wherein said master view pertains to a fee based full version of said software application and said first subordinate view pertains to a free lite version of said software application.

9. The method as recited in claim 1 wherein said master view pertains to a full version of said software application and said first subordinate view pertains to a limited functionality version of said software application.

10. The method as recited in claim 1 wherein said master view pertains to a default language version of said software application and said first subordinate view pertains to an alternate language version of said software application.

11. The method as recited in claim 1, wherein said multiple classes of user interfaces comprises at least two classes of user interfaces for a particular device having particular form factor, wherein the at least two classes have different functionality for the particular form factor.

12. The method as recited in claim 3, wherein said software application determining said appropriate user interface for said first device is also based on a functionality allowed at said first device, wherein said multiple classes of user interfaces comprises at least two classes of user interfaces for said first device, wherein the at least two classes have different functionality for a form factor of said first device.

13. The method as recited in claim 1, wherein said multiple classes of user interfaces comprises at least two classes of user interfaces for a particular form factor, wherein the at least two classes have different functionality for the particular form factor.

14. A non-transitory computer-usable storage medium having instructions embodied therein that when executed cause a computer system to perform a method for developing multiple classes of user interfaces for a software application, said method comprising:

displaying a master view for developing a software application for different device platforms, at a computer system, for use in developing multiple classes of user interfaces for said software application, wherein each of said multiple classes pertain to different versions of said software application executing on said different device platforms having at least a same form factor or a same operating system, and wherein said master view visually displays every attribute of said software application available for inclusion in a subordinate view during development;

displaying subordinate views for developing said software application, at said computer system, wherein each of sad subordinate views pertain to one of said multiple classes of user interfaces and comprise a plurality of groups of deltas that alter said master view , wherein each of sad subordinate views is for executing said software application on a device pertaining to a class of said multiple classes defined by a corresponding subordinate view, such that a first subordinate view is displayed on devices of a first class based on said master view combined with a first group of said deltas for said first subordinate view;

propagating a change to said master view to each of said subordinate views, at said computer system;

receiving an indication to hide an attribute of said software application for said first subordinate view;

hiding said attribute within said first subordinate view;

storing a change to said first subordinate view, at said computer system, as a delta in said first group of said deltas, such that said attribute is hidden from display within said first subordinate view for said devices of said first class; and creating said software application comprising said master view and a plurality of said groups of said deltas pertaining to said multiple classes, at said computer system, such that upon executing said software application at a first device, said software application will determine an appropriate user interface for said first device based on a form factor of said first device wherein said appropriate user interface is one of said multiple classes of user interfaces.

15. The non-transitory computer-usable storage medium as recited in claim 14, the method further comprising:

sending said software application to said first device wherein said software application comprises said multiple classes of user interfaces based on said master view and said plurality of groups of said deltas.

16. The non-transitory computer-usable storage medium as recited in claim 14, the method further comprising:

receiving said software application at said first device wherein said software application comprises said multiple classes of user interfaces based on said master view and said plurality of groups of said deltas; and executing said software application at said first device;

said software application determining an appropriate user interface for said first device based on a form factor of said first device wherein said appropriate user interface is one of said multiple classes of user interfaces;

determining a class of said multiple classes and a corresponding subordinate view for said class; and displaying said appropriate user interface at said first device by displaying said master view and a group of said deltas pertaining to said appropriate user interface defined by said corresponding subordinate view for said class.

17. The non-transitory computer-usable storage medium as recited in claim 14 wherein said master view pertains to a fee based full version of said software application and said first subordinate view pertains to a free lite version of said software application.

18. The non-transitory computer-usable storage medium as recited in claim 14 wherein said master view pertains to a full version of said software application and said first subordinate view pertains to a limited functionality version of said software application.

19. The non-transitory computer-usable storage medium as recited in claim 14 wherein said master view pertains to a default language version of said software application and said first subordinate view pertains to an alternate language version of said software application.

20. A non-transitory computer-usable storage medium having computer readable program code embedded therein for a software application developer, the program code comprising:

a software application developer with an interface for developing a software application for different device platforms by displaying a master view of said software application, at a computer system, for use in developing multiple classes of user interfaces for said software application, wherein each of said multiple classes pertain to different versions of said software application executing on said different device platforms having at least a same form factor or a same operating system, and wherein said master view visually displays every attribute of said software application available for inclusion in a subordinate view during development, for creating said software application comprising said master view and a plurality of groups of deltas pertaining to said multiple classes such that upon executing said software application at a first device, said software application will determine an appropriate user interface for said first device based on a form factor of said first device wherein said appropriate user interface is one of said multiple classes of user interfaces, said software application will determine a class of said multiple classes and a corresponding subordinate view for said class, and said software application will display said appropriate user interface at said first device by displaying said master view and a group of deltas pertaining to said appropriate user interface defined by said corresponding subordinate view for said class, said software application developer further comprising:

a subordinate views creator for developing said software application by displaying subordinate views wherein each of said subordinate views pertain to one of said multiple classes of user interfaces and comprise said plurality of groups of said deltas that alter said master view, wherein each of said subordinate views is for executing said software application on a device pertaining to a class of said multiple classes defined by a corresponding subordinate view, such that a first subordinate view is displayed on devices of a first class based on said master view combined with a first group of said deltas for said first subordinate view, and wherein said subordinate views creator is configured to hide an attribute within said first subordinate view based on receiving an indication to hide the attribute within said first subordinate view;

a change propagator for propagating a change to said master view to each of said subordinate views; and a storage for storing a change to said first subordinate view as a delta in said first group of said deltas, such that said attribute is hidden from display within said first subordinate view for said devices of said first class.

\* \* \* \* \*

UNITED STATES PATENT AND TRADEMARK OFFICE
CERTIFICATE OF CORRECTION

Page 1 of 1

PATENT NO. : 10,055,201 B2
APPLICATION NO. : 14/081949
DATED : August 21, 2018
INVENTOR(S) : Allen Bauer It is certified that error appears in the above-identified patent and that said Letters Patent is hereby corrected as shown below:

On the Title Page

Page 2, Column 1, OTHER PUBLICATIONS, Line 4:
Delete: "Deistrubted"
Insert: --Distributed--

In the Claims

Column 9, Claim 1, Line 36:
Delete: "sad"
Insert: --said--

Column 9, Claim 1, Line 64:
Delete: "view:"
Insert: --view;--

Column 11, Claim 14, Line 29:
Delete: "sad"
Insert: --said--

Column 11, Claim 14, Lines 32-33:
Delete: "plurality of groups of deltas that alter said master view
, wherein each of sad subordinate views is for executing"
Insert: --plurality of groups of deltas that alter said master view,
wherein each of said subordinate views is for executing--

Signed and Sealed this
Ninth Day of October, 2018

Andrei Iancu
*Director of the United States Patent and Trademark Office*